United States Patent
Yaung et al.

(10) Patent No.: US 7,861,155 B2
(45) Date of Patent: Dec. 28, 2010

(54) METHOD AND SYSTEM FOR PROVIDING MESSAGE PUBLISHING ON A DYNAMIC PAGE BUILDER ON THE INTERNET

(75) Inventors: Alan Tsu-I Yaung, San Jose, CA (US); Yauchen (Jason) Wu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 2039 days.

(21) Appl. No.: 09/800,400

(22) Filed: Mar. 5, 2001

(65) Prior Publication Data

US 2002/0124021 A1 Sep. 5, 2002

(51) Int. Cl.
*G06F 17/00* (2006.01)
*G06F 15/16* (2006.01)
*G06F 13/28* (2006.01)

(52) U.S. Cl. .............. 715/234; 715/255; 715/762; 709/202; 709/207; 709/217; 711/118

(58) Field of Classification Search .......... 707/5, 707/102, 530; 715/53 D, 501.1, 200, 201, 715/205, 209, 234, 251, 253, 254, 255, 256, 715/271, 272, 273, 700, 704, 760, 762, 763; 709/206, 201, 202, 203, 204, 217, 219, FOR. 109, 709/FOR. 110, FOR. 120, FOR. 122; 717/100, 717/106, 108, 110, 111, 114, 115, 116, 136, 717/139, 140, 153, 162, 165; 345/769; 711/3, 711/100, 106, 113, 118, 122, 125
See application file for complete search history.

(56) References Cited

U.S. PATENT DOCUMENTS

| | | | | |
|---|---|---|---|---|
| 6,035,119 A * | 3/2000 | Massena et al. | ............. | 717/100 |
| 6,065,012 A * | 5/2000 | Balsara et al. | ............. | 707/102 |
| 6,199,077 B1 * | 3/2001 | Inala et al. | ............... | 715/501.1 |
| 6,546,387 B1 * | 4/2003 | Triggs | ........................... | 707/5 |
| 6,697,825 B1 * | 2/2004 | Underwood et al. | ........ | 715/530 |

(Continued)

FOREIGN PATENT DOCUMENTS

WO 0072574 11/2000

OTHER PUBLICATIONS

Frontpage 2000Tutorial Table of Contents, by ACT360 Media Ltd in conjunction with Microsoft, Copyright 1999 (can be found at <http://www.actden.com/fp2000/java/toc.htm>).*

(Continued)

*Primary Examiner*—Laurie Ries
*Assistant Examiner*—Maikhanh Nguyen
(74) *Attorney, Agent, or Firm*—Sawyer Law Group, P.C.

(57) ABSTRACT

A method and system for publishing a message using a page builder tool is disclosed. The page builder tool is for providing a web page and linking the web page to a searchable database. The method and system include providing a message caching agent, a message cache and a message publishing agent. The message caching agent receives the message and provides the message to the message cache. The message publishing agent is coupled to the message cache and the page builder tool. The message publishing agent retrieves the message from the message cache and allows the message to be published on a web browser through the page builder tool in response to a request from the web browser.

14 Claims, 4 Drawing Sheets

U.S. PATENT DOCUMENTS

| | | | |
|---|---|---|---|
| 6,714,219 B2 * | 3/2004 | Lindhorst et al. | 345/769 |
| 2002/0138582 A1 * | 9/2002 | Chandra et al. | 709/206 |
| 2004/0066410 A1 * | 4/2004 | Lindhorst et al. | 345/769 |

OTHER PUBLICATIONS

Frontpage 97 Web Desing Guide (Allman, Ledtke, Stinson; published 1997 by The Waite Group, Inc).*

U.S. Appl. No. 60/230,037.*

Davies, John and Cochrane, Ralph, Knowledge Discovery and Delivery, *British Telecommunications Engineering*, Apr. 1998, vol. 17, pp. 25-35, XP-000765546.

* cited by examiner

METHOD AND SYSTEM FOR PROVIDING MESSAGE PUBLISHING ON A DYNAMIC PAGE BUILDER ON THE INTERNET

FIELD OF THE INVENTION

The present invention relates to computer systems, and more particularly to a method and system for allowing messages to be published using a page builder tool.

BACKGROUND OF THE INVENTION

FIG. 1 is a block diagram depicting a conventional page builder tool 10 that is used in conjunction with a datastore 20 and a web browser 30. The conventional page builder tool 10 is used to provide a web page (not shown) that is linked to the datastore 20. Using the web page, a client's web browser 30 can access information in the datastore 20. The web browser 30 is connected with the conventional page builder tool 10 via a LAN or the Internet (not explicitly depicted). Using the web page provided using the conventional page builder tool 10, the web browser 30 can interact with the conventional page builder tool 10 and request information archived in the datastore 20. The conventional page builder tool 10 can search the datastore 20 for information desired by the user of the web browser 30. For example, Dynamic Page Builder™ is a page builder tool provided by International Business Machines Corp. Using the Dynamic Page Builder, a developer can provide a web page linked to an IBM Digital Library™. Through the web page, the IBM Digital Library can be searched. The results of the search can be provided by the Dynamic Page Builder to the web browser for viewing by a user.

Although the conventional page builder tool 10 can be used to provide a web page and search the datastore 20, one of ordinary skill in the art will readily recognize that the conventional page builder tool 10 has limited functionality. In particular, it is often desired to broadcast, or publish, messages to users of the web page built by the conventional page builder tool 10. For example, it would be beneficial if system status reports, notices and other messages could be published to users of the web page. However, the conventional dynamic page builder 10 has no message publishing capability. Thus, for the message to be broadcast using the conventional page builder tool 10, the administrator of the web page must recreate the web page with the conventional dynamic page builder 10. The new web page would include the desired messages. If the messages are desired to be changed, deleted or supplemented with new messages, then the web page must again be created. This process is time-consuming and may result in errors in the web page.

Accordingly, what is needed is a system and method for publishing a message utilizing a dynamic page building tool. The present invention addresses such a need.

SUMMARY OF THE INVENTION

The present invention provides a method and system for publishing a message using a page builder tool. The page builder tool is for providing a web page and linking the web page to a searchable database. The method and system comprise providing a message caching agent, a message cache and a message publishing agent. The message caching agent receives the message and provides the message to the message cache. The message publishing agent is coupled to the message cache and the page builder tool. The message publishing agent retrieves the message from the message cache and allows the message to be published on a web browser through the page builder tool in response to a request from the web browser.

According to the system and method disclosed herein, the present invention allows a message to be published using a page builder tool.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional page builder tools allow a developer, such as an administrator, to create a web page and link the web page to a datastore. When a user connects to the web page via a web browser, the contents of the datastore can be searched using the conventional page builder tool.

Although the conventional page builder functions, one of ordinary skill in the art will readily realize that it is desirable to publish message via the web page. However, the conventional page builder tool has little or no specialized message publishing capabilities. Consequently, publishing a message via the web browser is difficult and time consuming.

The present invention provides a method and system for publishing a message using a page builder tool. The page builder tool is for providing a web page and linking the web page to a searchable database. The method and system comprise providing a message caching agent, a message cache and a message publishing agent. The message caching agent receives the message and provides the message to the message cache. The message publishing agent is coupled to the message cache and the page builder tool. The message publishing agent retrieves the message from the message cache and allows the message to be published on a web browser through the page builder tool in response to a request from the web browser.

The present invention will be described in terms of a particular page builder tool and a particular implementation. However, one of ordinary skill in the art will readily recognize that this method and system will operate effectively for other page builder tools and other implementations. Furthermore, the present invention is described in the context of a dynamic page builder tool that is used to link a web page to a searchable datastore. However, nothing prevents the use of the present invention with other page builder tools have other or different functionality.

Figure 1:
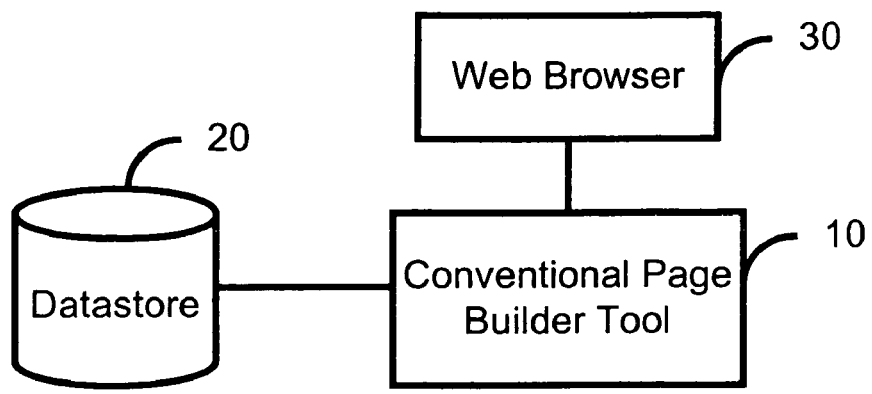
FIG. 1 is a block diagram of a conventional page builder tool in its environment.
Figure 2:
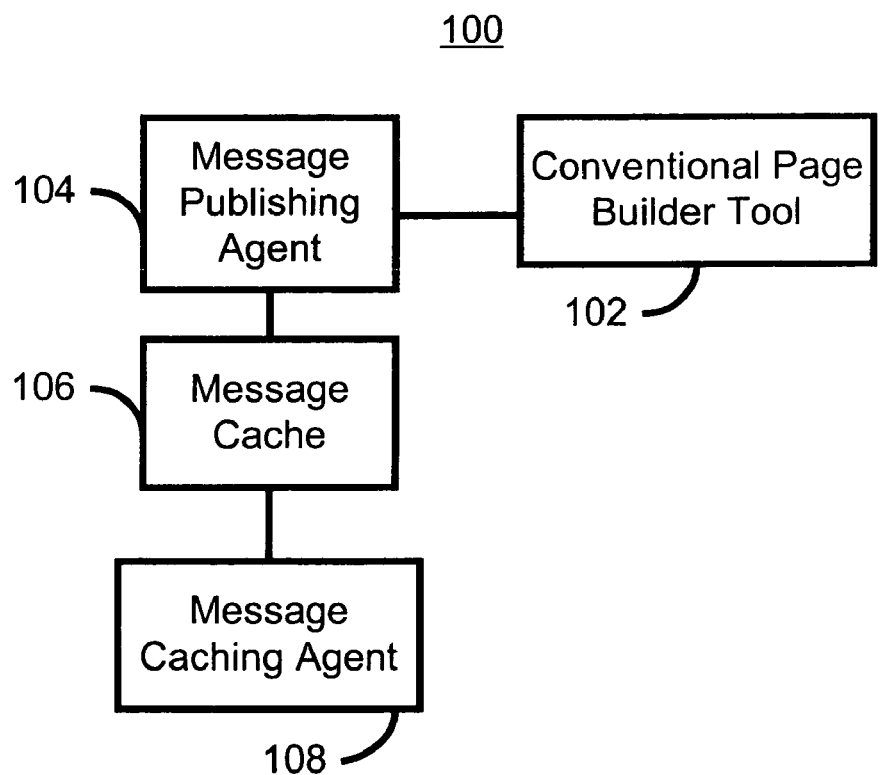
FIG. 2 is a block diagram of one embodiment of a page builder tool in accordance with the present invention.

To more particularly illustrate the method and system in accordance with the present invention, refer now to FIG. 2, depicting one embodiment of a page builder tool 100 in accordance with the present invention. The page builder tool 100 includes a conventional page builder tool 102, a message publishing agent 104, a message cache 106 and a message caching agent 108. The conventional page builder tool 102 is preferably a Dynamic Page Builder. Thus, one or more web pages may be provided using the page builder tool 100. The message caching agent 108 receives messages (not shown) that are to be published from an administrator. The messages have thus been prepared prior to being provided to the message caching agent 108. The message caching agent 108 places the messages in the message cache 106. The message cache 106 stores the messages for later publishing. The message cache 106 is preferably implemented as a flat file on the server side of the conventional dynamic page builder 102.

The message publishing agent 104 utilizes the conventional page builder tool 102 to publish the messages on a web browser (not shown) of a client. In a preferred embodiment, the message publishing agent 104 is a servlet that publishes the messages in response to requests from the web browser. Also in a preferred embodiment the message publishing agent utilizes the conventional page builder tool 102 by passing the messages to a portion of the web page residing on the web browser, as described below. The request which results in publication of the messages may be a specific request to view one or more messages or the request may simply be accessing one of the web pages provided using the page builder tool 100. In the latter case, messages would be published to any user that accessed the web page. In response to the request, the message publishing agent 104 retrieves the message(s) from the message cache 106 and publishes the message(s) using the conventional page builder tool 102. Preferably, this is accomplished using the web page provided by the conventional page builder tool 102. In a preferred embodiment, the message publishing agent 104 provides the message(s) to an applet in the web page on the web browser. Also in a preferred embodiment, the message(s) are pushed to the web browser using the message publishing agent 104, rather than requiring the web browser to pull the message(s). However, in an alternate embodiment, the message publishing agent 104 could provide the message to the web browser through the conventional page builder tool 102 in another fashion.

Thus, the page builder tool 100 in accordance with the present invention is capable of publishing, or broadcasting, messages on all web pages provided using the page builder tool 100. When the messages are pushed, as in the preferred embodiment, a client can obtain the most recent messages without refreshing the web page of interest. In addition, the messages can be provided dynamically. An administrator may simply provide a message to the message cache when desired. The page builder tool 100 will automatically publish the message. Furthermore, based on the type of request that will result in publication of the message, the message can be integrated into the web page so that accessing the web page will ensure that the message is published.

Figure 3:
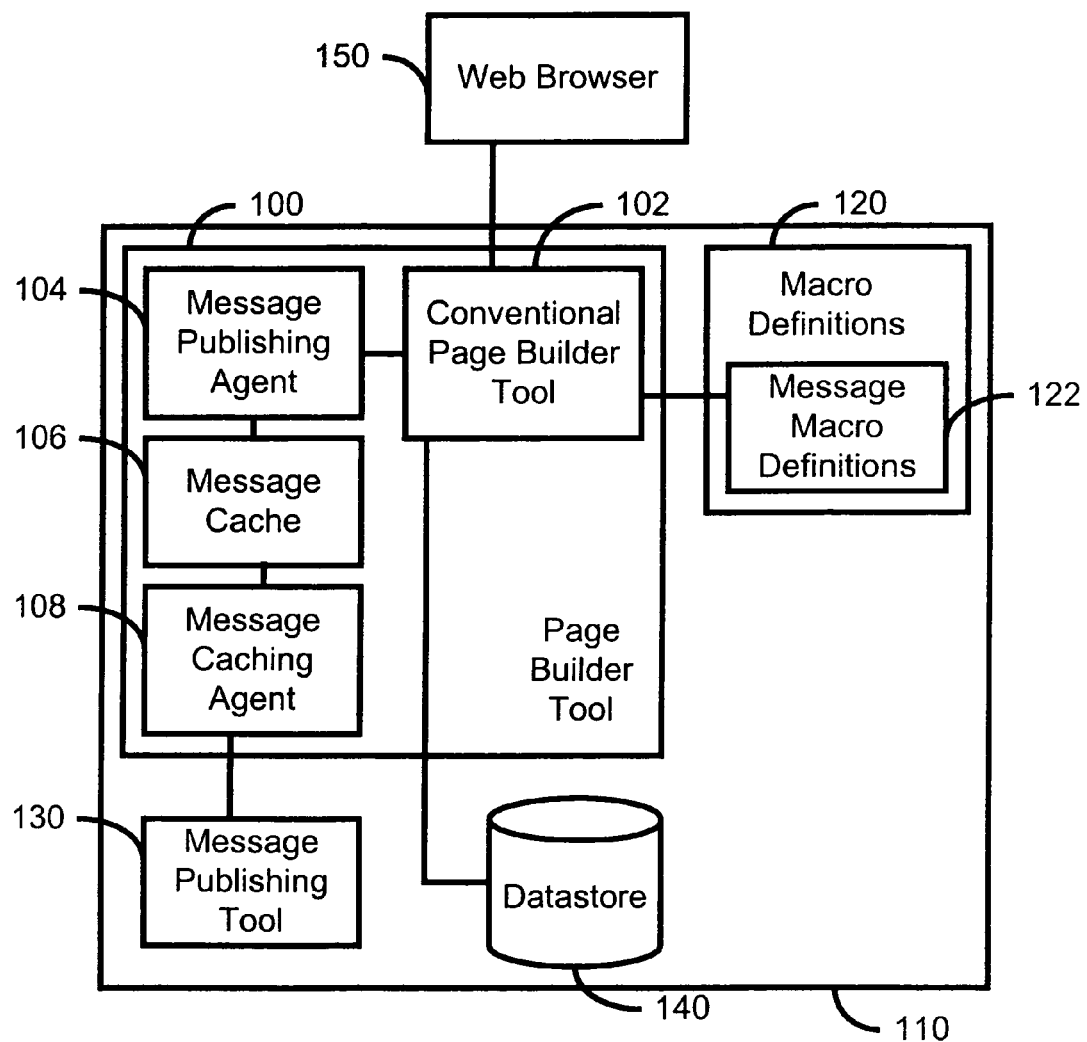
FIG. 3 is a block diagram of one embodiment of a page builder tool in accordance with the present invention as used in a computer system.

FIG. 3 depicts a preferred embodiment of a system 110 incorporating one embodiment of the page builder tool 100 in accordance with the present invention. The system 110 can be used to provide web pages capable of searching a database and message publishing. The system 110 includes the page builder tool 100, a set of macro definitions 120, a message publishing tool 130 and a datastore 140. The macro definitions 120 include at least one message publishing macro definition 122. In one embodiment, a different message publishing macro definition 122 is provided for each message. In another embodiment, messages might share the message publishing macro definition 122 so that they will all be published when the message publishing macro definition 122 is processed. The message publishing macro definition 122 preferably includes an applet (not shown) that is provided to the web browser 150 through the web page (not explicitly shown). Thus, the applet for the message publishing macro definition 122 could be considered to reside in the browser side of the web page provided using the conventional page builder tool 110. The conventional page builder tool 102 is preferably a Dynamic Page Builder™ from International Business Machines Corp. The datastore 140 may be a digital library, such as the IBM Digital Library™.

The system 110 and thus conventional page builder tool 102 are coupled to the web browser 150. The connection to the web browser 150 may be through the Internet (not explicitly shown), a LAN (not explicitly shown) or other mechanism. Thus, the web browser 150 may be remote from the system 110. id as The message publishing tool 130 is coupled with the message caching agent 108 in the page builder 100. The message publishing tool 130 may be implemented as a simple software unit, for example in C++, that accepts a message string from a keyboard (not shown). The message publishing tool 130 can thus be used by the administrator or other user to create the message(s) to be published. The message publishing tool 130 also provides the messages to the message caching agent 108. The message caching agent 108 functions as described above. The conventional page builder tool 102 is coupled to the datastore 140. The datastore 140 contains information which is searchable through a web page provided by the conventional page builder tool 102 and, therefore, by the page builder tool 110. Operation of the page builder system 110 is described below with respect to FIGS. 4 and 5.

Figure 4:
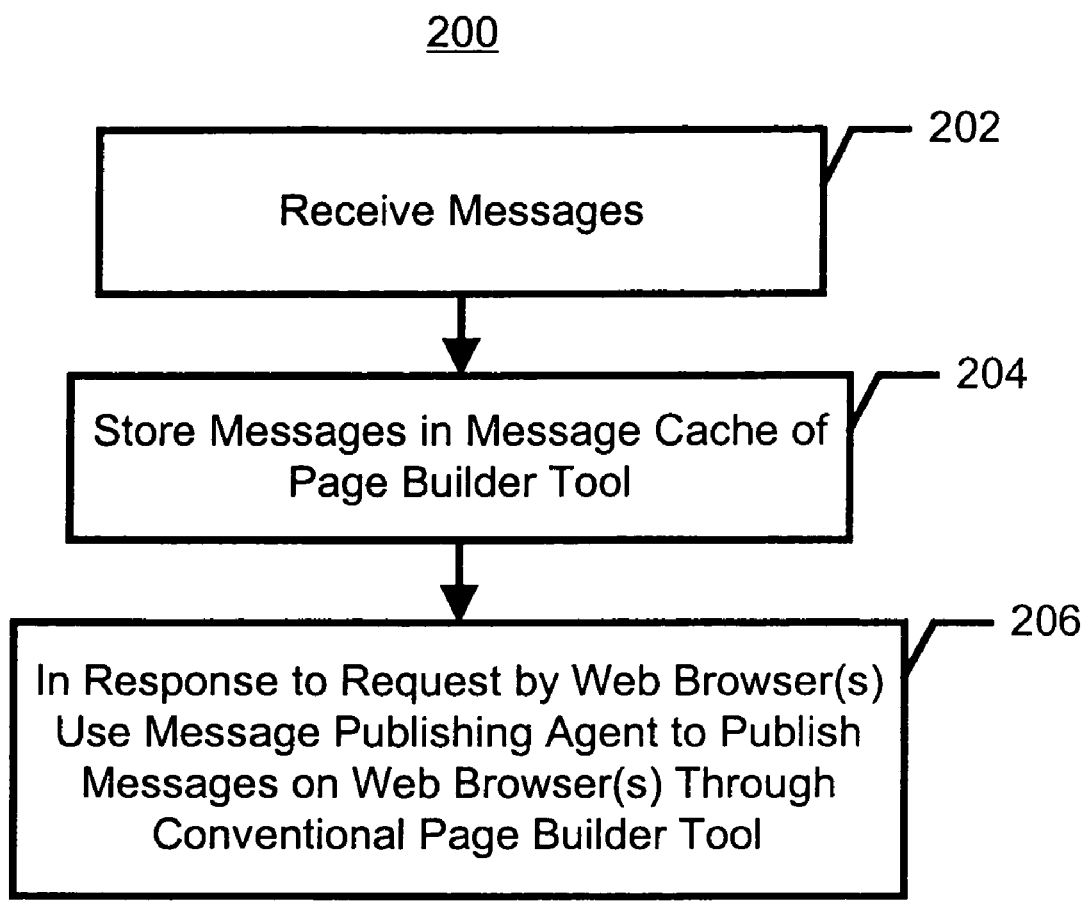
FIG. 4 is a high-level flow chart of one embodiment of a method in accordance with the present invention for publishing messages using a page builder tool.

FIG. 4 depicts a high-level flow chart of a method 200 in accordance with the present invention for publishing messages. The method 200 is described in conjunction with the system 110 depicted in FIG. 3. Messages are received by the page builder tool 110, via step 202. In a preferred embodiment, the messages are received by the message caching agent 108 and preferably provided from the message publishing tool 130. The messages are stored in the message cache 106, via step 204. The messages are published on the web browser 150 using the message publishing agent 104 in response to a request from the web browser 150, via step 206. The message publishing agent 104 publishes the messages through the conventional page builder tool 102. Preferably, this is accomplished using the web page provided by the conventional page builder tool 102.

Figure 5:
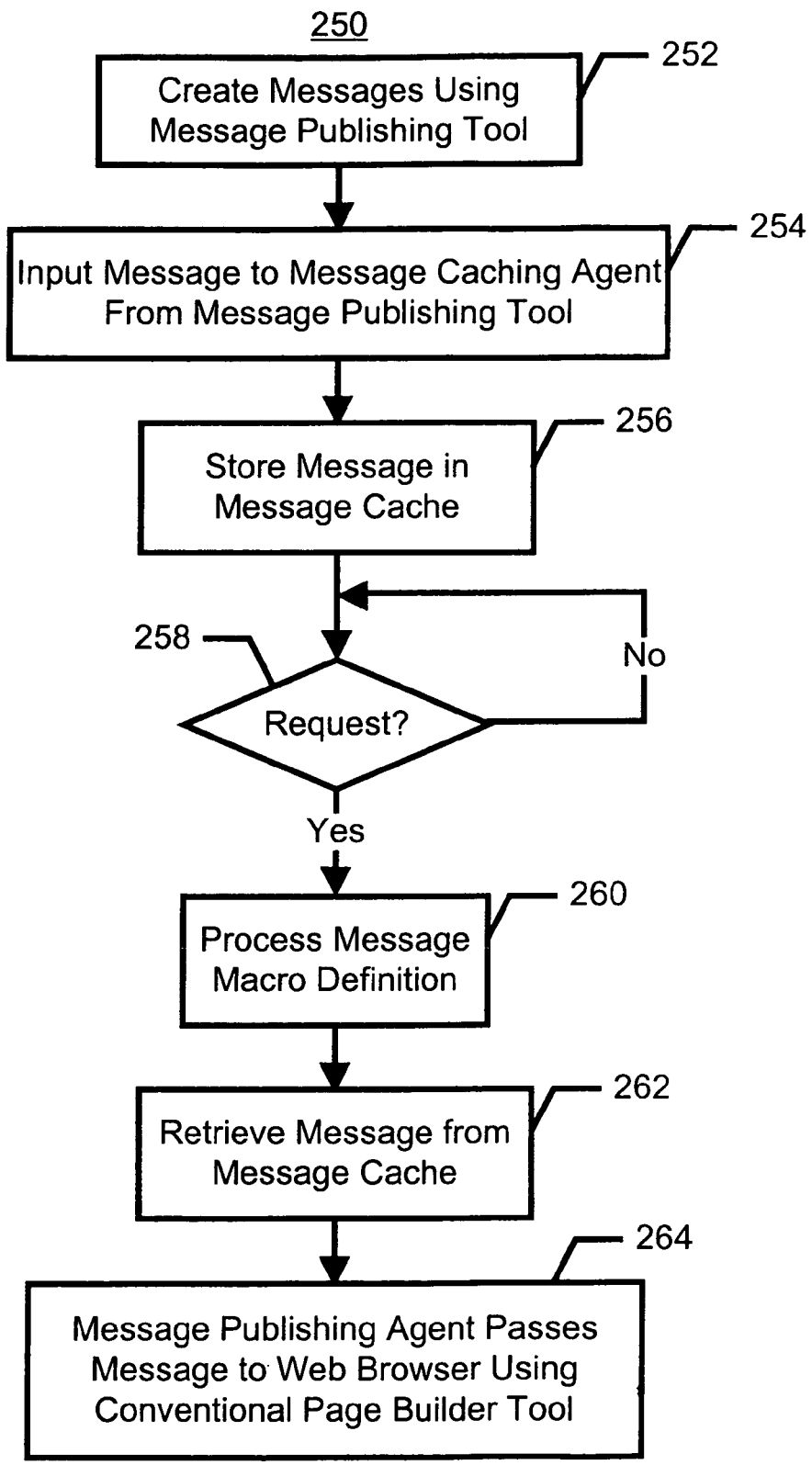
FIG. 5 is a more detailed flow chart of one embodiment of a method in accordance with the present invention for publishing messages using a page builder tool.

FIG. 5 depicts a more detailed flow chart of a method 250 in accordance with the present invention for publishing messages. The method 250 is described in the context of a single web page and a single message. However, the method 250 functions for multiple web pages and multiple messages. The method 250 is described in conjunction with FIG. 3. Referring to FIGS. 3 and 5, an individual, such as an administrator of the web page, creates a message, via step 252. The message is preferably created using the message publishing tool 130. The message is input to the message caching agent 108, via step 254. The message caching agent 108 stores the message in the message cache 106, via step 256. It is then determined whether a request has been received from the web browser 150, via step 258. If the request has been received then the message publishing macro definition 122 is processed by the conventional page builder 102, via step 260. As a result, the message publishing agent 104 retrieves the message from the message cache 106, via step 262. The message publishing agent 104 then passes the message to the applet from the message publishing macro definition 122 in the web browser, via step 264. Thus, the message publishing agent is the servlet for the applet included in the message publishing macro definition 122 and provided to the web browser 150 in the web page. Thus, the web browser 150 can display the message for the end user.

Thus, the system 110 and methods 200 and 250 in accordance with the present invention is capable of publishing, or broadcasting, messages on all web pages provided using the page builder tool 100. When the messages are pushed, as in the preferred embodiment, a client can obtain the most recent messages without refreshing the web page of interest. In addition, the messages can be provided dynamically. An administrator may simply provide a message to the message cache when desired. The page builder tool 100 will automatically publish the message. Furthermore, based on the type of request that will result in publication of the message, the message can be integrated into the web page so that accessing the web page will ensure that the message is published.

A method and system has been disclosed for providing message publishing using a page builder tool. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system including at least one processor for publishing a message using a page builder tool, the page builder tool for creating and providing a web page having web page information for publication on a web browser and linking the web page to a searchable database such that search results from the searchable database are included in the web page information published in the web page, the system comprising:
   a message caching agent for receiving the message, the message being provided by a user and being separate from the web page information;
   a message cache coupled to the message caching agent for storing the message, the message cache receiving the message from the message caching agent, the message cache being a local cache for the page builder tool;
   a message publishing agent coupled to the message cache and the page builder tool, the message publishing agent for retrieving the message from the message cache and allowing the message to be published in the web page on a web browser using the page builder tool, wherein the message publishing agent allows the message to be published in the web page on the web browser by pushing the message to the web browser using the page builder tool such that the message is published in the web page using the page builder tool independently of the publishing of the web page information by the page builder tool; and
   a message publishing macro definition coupled to the page builder tool, wherein the page builder tool provides the web page to the web browser and processes the message publishing macro definition provided for the web page, wherein the message publishing macro definition causes the message publishing agent to retrieve the message from the message cache and push the message to the web browser, wherein the message is published in the web page without the web browser having to refresh the web page,
   wherein the message publishing macro definition includes an applet for retrieving the message from the message publishing agent and publishing the message when the message publishing macro definition is processed by the page builder tool.

2. The system of claim 1, wherein the message publishing agent is a servlet.

3. The system of claim 1, further comprising: a message publishing tool for allowing a user to create the message and provide the message to the message caching agent, the message not being in a web page format, and being one of a system status report and a notice to users of the searchable database, wherein the user providing the message is an administrator of the web page.

4. The system of claim 1, wherein the message publishing agent allows the message to be published on the web browser through the page builder tool in response to a request from the web browser.

5. A method for publishing a message using a page builder tool, the page builder tool for creating and providing a web page having web page information for publication on a web browser and linking the web page to a searchable database such that search results from the searchable database are included in the web page information published in the web page, the method comprising:
   receiving a message by a message caching agent, the message being provided by a user and being separate from the web page information;
   storing the message in a message cache connected to the page builder tool using the message caching agent, the message cache being a local cache for the page builder tool; and
   utilizing a message publishing agent to retrieve the message from the message cache and publish the message in the web page on a web browser using the page builder tool, wherein the message publishing agent allows the message to be published in the web page on the web browser by pushing the message to the web browser using the page builder tool such that the message is published in the web page using the page builder tool independently of the publishing of the web page information by the page builder tool,
   wherein the retrieving and publishing step further includes the steps of:
   triggering the message publishing agent to retrieve and publish the message using a message publishing macro definition coupled to the page builder tool, wherein the page builder tool provides the web page to the web browser and processes the message publishing macro definition provided for the web page, wherein the message publishing macro definition causes the message publishing agent to retrieve the message from the message cache and push the message to the web browser, wherein the message is published in the web page without the web browser having to refresh the web page, and
   wherein the message publishing macro definition includes an applet that retrieves the message from the message publishing agent and publishes the message when the message publishing macro definition is processed by the page builder tool.

6. The method of claim 5, wherein the message from the message cache is broadcast in all web pages created by the page builder tool.

7. The method of claim 5, wherein the message publishing agent is a servlet.

8. The method of claim 5, further comprising the step of:
allowing a user to create the message and provide the message to a message caching agent using a message publishing tool, the message not being in a web page format, and being one of a system status report and a notice to users of the searchable database, wherein the user providing the message is an administrator of the web page.

9. The method of claim 5, wherein the retrieving and publishing step further includes the step of:
publishing the message on the web browser through the page builder tool in response to a request from the web browser.

10. A non-transitory computer-readable storage medium containing a program for publishing a message using a page builder tool, the page builder tool for creating and providing a web page having web page information for publication on a web browser and linking the web page to a searchable database such that search results from the searchable database are included in the web page information published in the web page, the program including instructions for:
receiving a message by a message caching agent, the message being provided by a user and being separate from the web page information;
storing the message in a message cache connected to the page builder tool using the message caching agent, the message cache being a local cache for the page builder tool; and
utilizing a message publishing agent to retrieve the message from the message cache and publish the message in the web page on a web browser using the page builder tool, the message publishing agent allows the message to be published in the web page on the web browser by pushing the message to the web browser using the page builder tool such that the message is published in the web page using the page builder tool independently of the publishing of the web page information by the page builder tool,
wherein the retrieving and publishing instructions further include instructions for:
triggering the message publishing agent to retrieve and publish the message using a message publishing macro definition coupled to the page builder tool, wherein the page builder tool provides the web page to the web browser and processes the message publishing macro definition provided for the web page, wherein the message publishing macro definition causes the message publishing agent to retrieve the message from the message cache and push the message to the web browser, wherein the message is published in the web page without the web browser having to refresh the web page, and
wherein the message publishing macro definition includes an applet that retrieves the message from the message publishing agent and publishes the message when the message publishing macro definition is processed by the page builder tool.

11. The non-transitory computer-readable storage medium of claim 10, wherein the message is one of a system status report and a notice to users of the searchable database.

12. The non-transitory computer-readable storage medium of claim 10, wherein the message publishing agent is a servlet.

13. The non-transitory computer-readable storage medium of claim 10, further comprising the step of:
allowing a user to create the message and provide the message to a message caching agent using a message publishing tool, the message not being in a web page format, wherein the user providing the message is an administrator of the web page.

14. The non-transitory computer-readable storage medium of claim 10, wherein the retrieving and publishing instructions further includes instruction for:
publishing the message on the web browser through the page builder tool in response to a request from the web browser.

* * * * *